United States Patent [19]

Mendenhall

[11] 3,845,941

[45] Nov. 5, 1974

[54] APPARATUS FOR PRODUCING ASPHALT-AGGREGATE COMPOSITIONS

[76] Inventor: Robert L. Mendenhall, 1770 Industrial Rd., Las Vegas, Nev. 89102

[22] Filed: May 15, 1973

[21] Appl. No.: 360,464

Related U.S. Application Data

[63] Continuation-in-part of Ser. No. 286,613, Sept. 5, 1972.

[52] U.S. Cl. ............................................. 259/157
[51] Int. Cl. ........................................... B28c 5/06
[58] Field of Search .......... 259/157, 156, 155, 158, 259/159, 3, 14, 30; 34/108, 140, 130, 138; 165/88; 106/273

[56] References Cited
UNITED STATES PATENTS

| | | | |
|---|---|---|---|
| 1,189,772 | 7/1916 | Ammann | 259/156 |
| 2,034,860 | 3/1936 | Dalin | 34/140 |
| 2,421,345 | 5/1947 | McConnaughay | 259/158 |
| 2,715,517 | 8/1955 | Bojner | 259/157 |
| 2,884,229 | 4/1959 | Francis | 34/108 |

*Primary Examiner*—Robert W. Jenkins
*Attorney, Agent, or Firm*—Jerry R. Seiler

[57] ABSTRACT

Asphalt-aggregate compositions are prepared in an elongated cylindrical drum having a plurality of hollow heated and spaced pipes extending therealong. Aggregate and asphalt are introduced into the drum at one end, the drum is rotated thereby mixing and heating the components and the finished composition is withdrawn at the other drum end. The apparatus includes a heating chamber at one end of the drum which communicates with the hollow pipe interiors and includes means for venting at least a portion of unburned hydrocarbon volatiles, smoke and gaseous mixtures from the heated composition into the heating chamber for further combustion while steam or water vapor are vented from the other end of the interior drum chamber.

8 Claims, 4 Drawing Figures

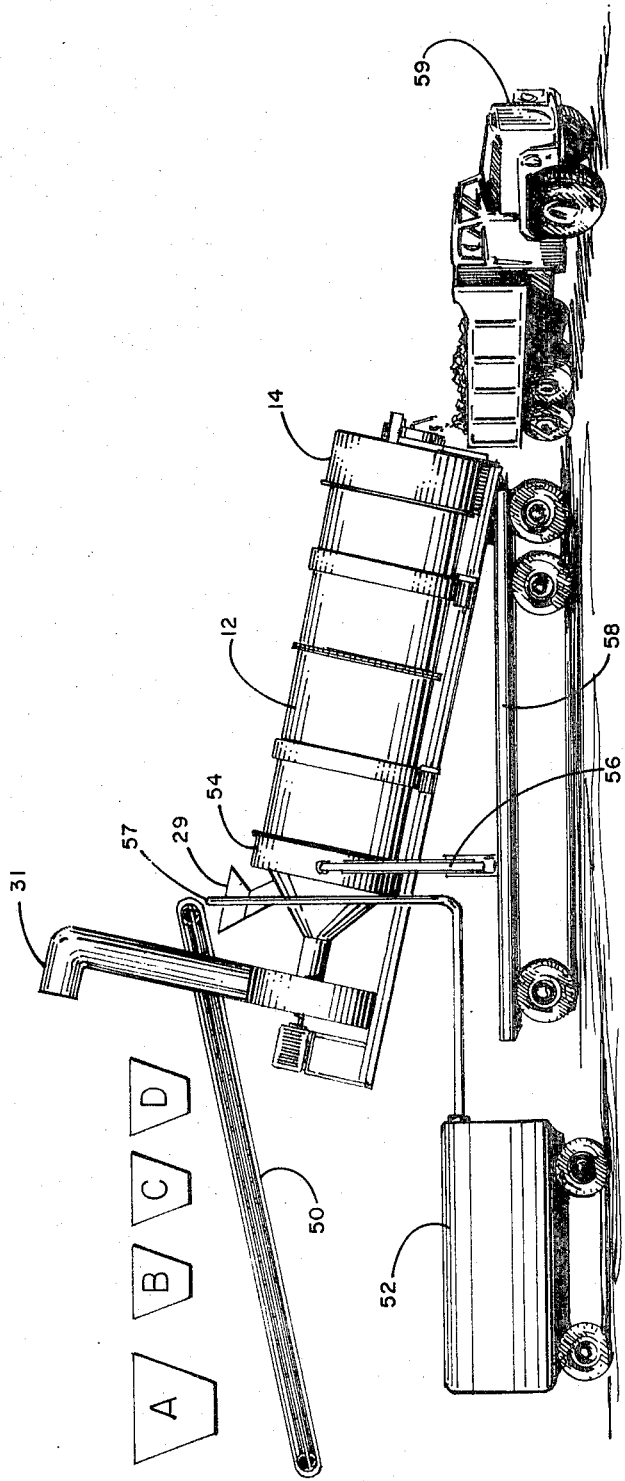

APPARATUS FOR PRODUCING ASPHALT-AGGREGATE COMPOSITIONS

This application is a continuation-in-part of my co-pending application Ser. No. 286,613, filed Sept. 5, 1972.

BACKGROUND OF THE INVENTION

In my aforesaid co-pending application there is described a process and apparatus for recycling used asphalt-aggregate compositions. That apparatus, of which the present invention constitutes an improvement, includes an elongated cylindrical drum having a plurality of heating tubes extending substantially along the length of the drum interior. Used asphalt-aggregate compositions are recycled by introducing them into one end of the drum and rotating the drum while applying heat to the interior of the tubes so that the composition becomes heated gradually by contact with the heated tube surfaces. The description of that apparatus and the method of its use is incorporated herein by reference.

The heating of asphalt containing compositions or mixtures without subjecting the material to flame or hot gases, as set forth in my prior application, is highly advantageous over processes and apparatus such as described in U.S. Pat. No. 3,423,222 in which the materials are directly exposed to flame emitted from a burner or similar heat source. Not only does such exposure to direct flame or hot gases cause burning and deterioration of asphalt but the resulting smoke and vapors drawn into the atmosphere are obviously a pollution hazard.

Previous methods of heating a composition utilizing tumbling action within a cylinder such as described in the aforesaid patent are quite inefficient since the only portion of the material being heated is that exposed on the surface of the mass as it cascades in the rotating cylinder. Such a disadvantage is eliminated utilizing the heating pipes thus not only avoiding contamination and burning of the asphalt, since there is no exposure to flame, but greatly increases the efficiency of heating since a significant amount of material is in contact with the hot pipes. Moreover, complete mixing of the composition is greatly facilitated because the pipes act to deflect the material in different directions as the drum or cylinder rotates thereby increasing the mixing effect during the tumbling and heating operation with the result of improving the composition's homogeneity.

However, even with the improved apparatus in which heating uniformity and efficiency are much improved as is mixing, it is found that when introducing the materials having a significant amount of moisture thereon such as used asphalt-aggregate composition or aggregate which has become wetted, there is much water vapor or moisture given off during the heating process. The presence of significant amounts of moisture may interfere with asphalt coating characteristics especially as condensation occurs on cooler aggregate and interior drum walls. Thus, the moisture is preferably removed from the interior of the drum so as not to interfere with the asphalt coating of the aggregate as well as to facilitate composition temperatures in the desired ranges of about 275°–325°F with expenditure of unnecessary fuel. As such temperatures are approached, especially in the composition at the hotter end of the drum chamber, hydrocarbon volatiles and smoke are given off from the hot asphalt and which materials if vented directly into the atmosphere are obviously undesirable atmospheric pollutants. It is to the elimination of this problem as well as to further improve heating and mixing efficiency in producing asphalt-aggregate compositions that the present invention is directed.

SUMMARY OF THE INVENTION

The present invention is intended to eliminate a number of problems resulting from heating and mixing asphalt and aggregate in order to form compositions such as asphaltic concrete and the like which involve coating of aggregate-type material such as sand, rock and other minerals with asphalt or bitumen products. In the improved process of the invention fresh or previously uncoated aggregate materials together with the asphalt are fed into an elongated cylindrical drum incorporating the heating tubes as previously described. A portion of the raw material may include used asphalt-aggregate compositions and which material may be combined with additional fresh aggregate as well as asphalt all of which are introduced together into the heating drum. The advantages of combining asphalt and aggregate, any portion of which may include used asphalt-aggregate materials, directly into the heating and mixing apparatus of the invention is the substantial elimination of further processing, heating or mixing. For example, the steps of wet scrubbing, dust collecting, re-screening and storing may be entirely eliminated utilizing the instant process and the product of which may be used directly for road surfacing.

The apparatus of the present invention not only achieves a final product which may be used for road surfacing but produces it directly from the raw aggregate and asphalt materials. Thus, the state of the art processing and equipment which require wet scrubbers, dust collectors and screws, bucket elevators, hot storage bin, screening operations, weigh bins, pug mill, etc., are no longer required thereby greatly reducing manufacturing costs. However, not only is cost reduced as are equipment requirements and processing steps and time, but other advantages include higher temperature heating without danger of burning the asphalt, in situ removal of water and moisture, high heating efficiency and low heat loss, and low atmospheric pollution due to smoke and removal of unburned hydrocarbon volatiles from the heated asphalt. Additional advantages and features of the process and apparatus will become more evident from the following detailed description.

BRIEF DESCRIPTION OF THE DRAWINGS

FIG. 4 is a schematic view illustrating processing techniques and equipment use according to the invention.

DETAILED DESCRIPTION OF THE INVENTION

Figure 1:
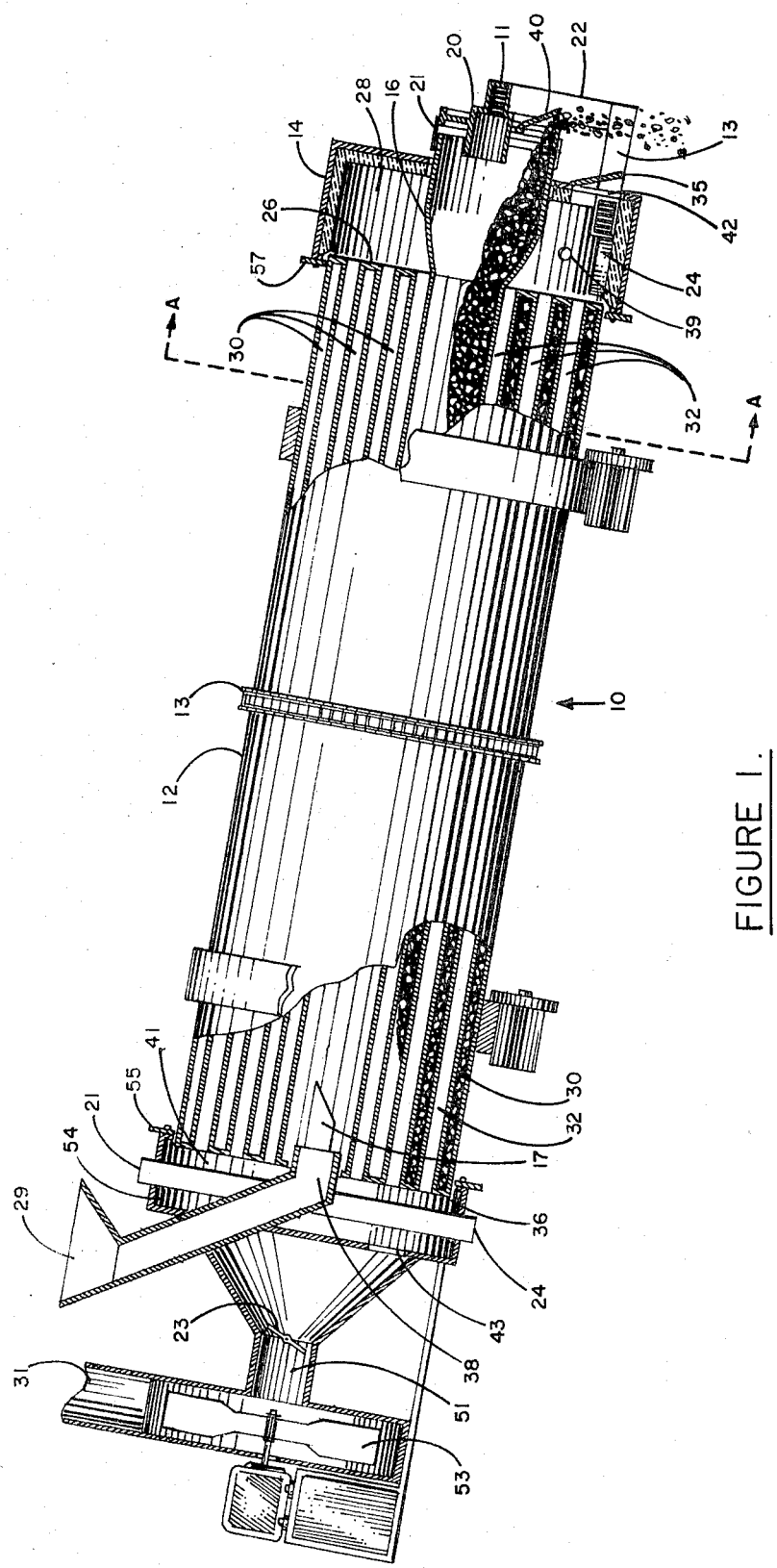
FIG. 1 is a side elevational view, partly in section illustrating the heating and mixing apparatus according to the invention.

FIG. 1 illustrates the general apparatus 10 which comprises an elongated cylindrical drum 12 having a hollow interior 30 and which drum is capped on each end by plates or walls 26 and 36 respectively. Extending along the drum interior between walls 26 and 36 are a plurality of tubes or pipes 32, only a few of which are shown for simplicity. These pipes have a hollow interior and substantially terminate and are open at the respective end walls between which they extend.

Figure 3:
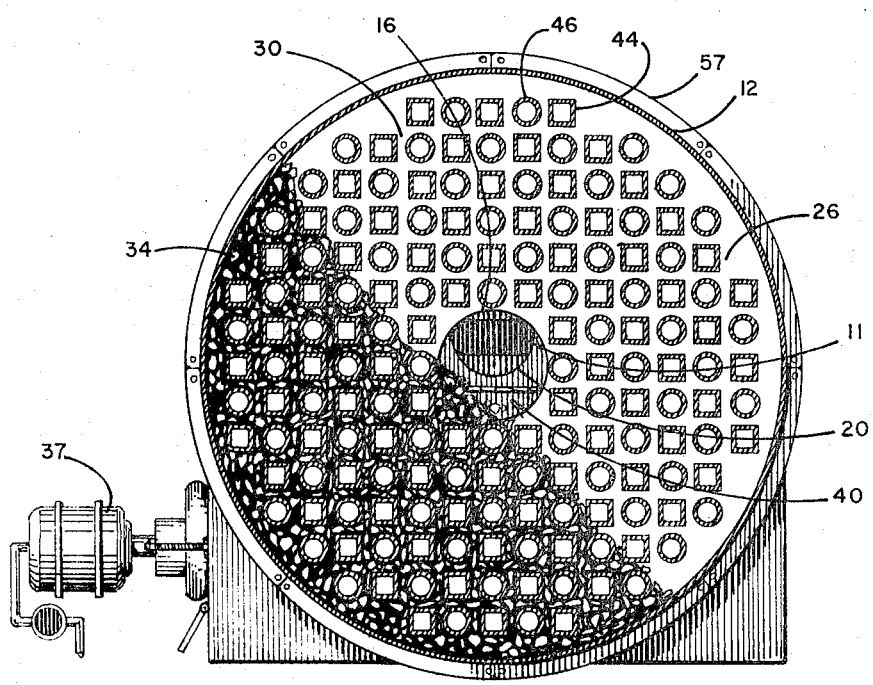
FIG. 3 is an end elevation taken along line A—A of FIG. 1 showing the heating tubes and interior mixing chamber of the heating and mixing drum.

Referring also to FIG. 3, the plurality of pipes extend through end wall 26 so that the hollow pipe interiors 32 open exteriorly of the end wall. It is also noted that drum interior 30 is hollow except for the pipes. End wall 26 is rigidly secured to one end of the cylindrical drum as is the opposite wall 36.

Another feature of the improved apparatus includes the preferred use of alternating square and round pipes 44 and 46 respectively and which pipes are separated sufficiently to allow cascading asphalt and aggregate material to pass therebetween as the drum is rotated. However, it should be appreciated that the specific ratio of square to round pipes is not critical so long as the desired heating and mixing efficiencies are achieved. A cross-section of aggregate-asphalt composition 34 is illustrated in FIG. 3 as it might appear at any instant with drum 12 rotating clockwise. It will also be appreciated that any number of pipes may be used and the size and distance between the pipes may be varied as desired. However, the more pipes utilized, the more surface area provided and concomitantly the greater will be the heating efficiency and also the mixing capabilities as the components are deflected between the pipes as the composition cascades during drum rotation.

Figure 2:
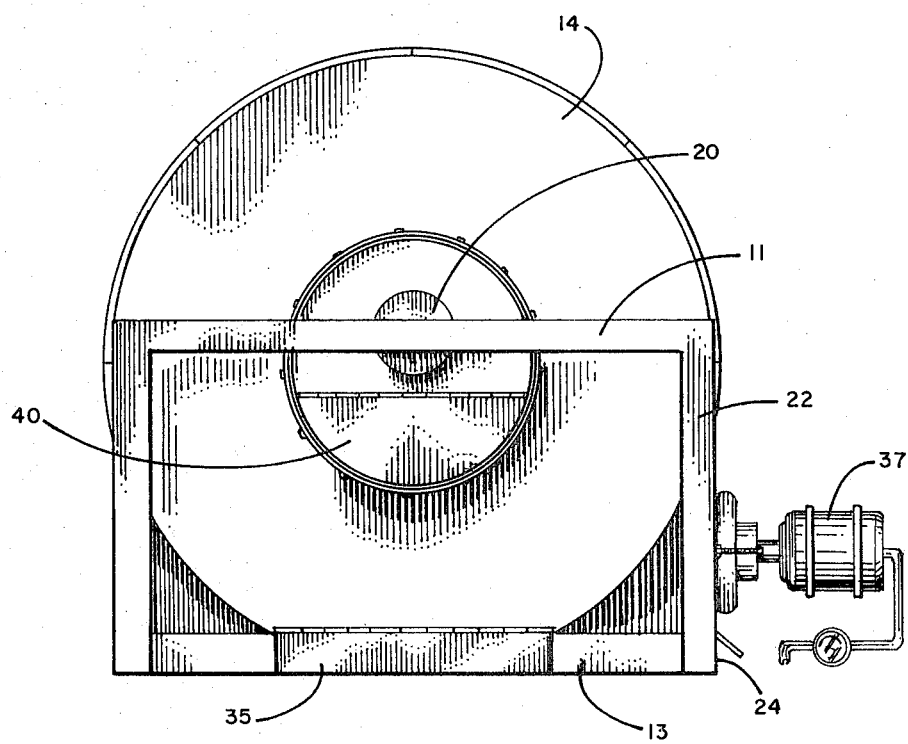
FIG. 2 is an end elevational view illustrating the product discharge or recovery end of the apparatus and associated volatiles return ducts.

Observing now also FIG. 2, there is shown the forward and product recovery end of the apparatus including a heating chamber collar or cover 14 which extends over the forward end of drum 12 thereby defining the heating chamber 28 as seen in FIG. 1. Also extending outwardly from end wall 26 is material recovery chute 16 and around which the center aperture of cover 14 extends. Thus, heated and thoroughly mixed asphalt-aggregate composition which is ready for use is recovered from the lip of chute 16 and which chute communicates with the interior 30 of the drum through end wall 26. This may also be viewed in FIG. 3 in which chute 16 is shown attached to end wall 26 at the opening or aperture. Thus, composition in the drum is expelled through this opening onto the chute. The funnel shape of chute 16 shown in FIG. 1 is not particularly critical and could be cylindrical if desired.

The heating chamber cover assembly also includes means for drawing unburned hydrocarbon volatiles, smoke and gases from the drum interior and directing them into the heating chamber for more complete combustion thereby reducing unburned smoke and eye irritating chemicals from being vented directly into the atmosphere. To achieve such a feature and improvement of the invention cover 14 is provided with a vent tube 20 which extends into chute 16. A duct assembly communicates with tube 20 and includes horizontal duct 11 which leads from tube 20, vertical duct 22 which leads to bottom duct 13 and communicating with heating chamber 28. Again, the purpose of this duct assembly and vent tube 20 is to pull or vent hydrocarbon gases, volatiles and smoke from the interior of the heating drum into the heating chamber for further combustion thereby reducing the amount of smoke and unburned hydrocarbon pollution being vented into the atmosphere.

Removal of smoke and gases is assisted by maintaining the heating chamber at a lower pressure or at a vacuum as compared to the interior drum in which the aggregate and asphalt are being mixed. This is further explained by observing in FIG. 1 that pipe interiors 32 communicate with heating chamber 28, and, at the opposite or material input end, with an exhaust chamber 41. In turn, the exhaust chamber opens into exhaust sleeve 51 via port 43 and exhaust stack 31. A motor driven exhaust fan 53 draws the hot gases from the heating chamber through the hollow pipe interiors 32 thus causing a vacuum or lower pressure in the heating chamber and in turn pulls a draft on the interior of the drum. Accordingly, smoke, unburned hydrocarbons and other volatile gaseous materials from the heated asphalt are drawn into vent tube 20, through ducts 11, 22 and 13 and into the heating chamber 28 where the incompletely combusted materials are subjected to a flame from burner port 39.

It will usually be necessary to vent in additional outside air to support more complete oxidation and combustion in the heating chamber. Thus, a pair of vent ports 24 and 42 allow atmospheric air to enter into heating chamber 28 and which air will be drawn in due to the draft created within the heating chamber during operation. The amount of air can be adjusted by further opening closing vent doors 35. The amount of draft or vacuum created in the system can also be regulated somewhat by damper 23 situated in exhaust sleeve 51. An operator can adjust both the amount of gases being exhausted through the exhaust by adjusting damper 23 as well as the quality of the exhaust by regulating both the damper and the openings of ports 24 and 42 depending on the amount of combustion required to eliminate blue smoke and other unburned hydrocarbons being exhausted.

Adjustable seals may be provided between exhaust chamber cover 54 and heating chamber cover 14 and cylindrical drum 12. These covers remain stationary during operation while the drum is rotated so that they should not fit tightly or abut against the rotating cylindrical drum. Yet in order to prevent significant and undesirable air vents between these components, adjustable seals 55 and 57 may be provided on covers 54 and 14 respectively. Similar seals 21 may also be provided between rotating chute 16 and stationary forward vent assembly componets as shown as well as between any similar portions of the apparatus. These seals may comprise a flexible material such as plastic, rubber or the like which can be adjusted to close significant openings between the stationary or component covers and the rotating drum and yet which because of their flexibility will not slow down or hinder the drum rotation while at the same time providing the desired air seals. Thus, by using such seals, uncontrolled venting of internal gases into the atmosphere, or entry of air to cause undesired cooling and affecting internal pressure regulation is reduced. Yet, an operator can substantially regulate the amount of atmospheric air entering the system during operation by varying the openings of the vent ports 24 and 42 and also controlling the damper 23.

Referring further to FIG. 1, a moisture and water vapor vent system is located at the material input and exhaust end of the apparatus. This vent system comprises a pipe or conduit 30 extending into the interior drum chamber and which pipe communicates with conduits 21 and 25 opening directly into the atmosphere. Water vapor or moisture given off by the wet aggregate being heated as it first enters the drum can be directly vented. Often, when wet aggregate is initially placed into the drum via funnel 29, rather large amounts of water vapor and moisture will be given off as the aggregate is heated. The moisture vent system is provided at the cooler end of the drum to remove substantial amounts of the moisture and water vapor from the aggregate at an early stage prior to the material reaching the product recovery end of the apparatus. Early removal of excess moisture also prevents water from interfering with aggregate coating by the asphalt. It will also be appreciated that since the temperatures at the material input end are lower than those achieved closer to the product recovery end, greater amounts of hydrocarbon volatiles, smoke, etc. are usually given off closer to the hotter end of the apparatus. Thus, most of the water vapor and moisture are removed from the aggregate at the cooler input end while the majority of the smoke and hydrocarbon volatiles are given off toward the product recovery end so that the dual venting system of the apparatus is highly effective for the desired purpose. Although some moisture may escape through hopper 29, the amount will usually be negligable because most of the water vapor will condensate along the length of the chute. Moreover, it may be desirable to include a flexible or hinged door or gate in the chute which can be displaced to allow material to enter the drum but which would otherwise keep moisture from passing out of the hopper or condensing in the chute.

Aggregate and asphalt are simultaneously placed in hopper funnel 29 and which materials will enter the interior of the cylindrical drum through chute 38. The drum is set at an angle relative to horizontal, with the product recovery end depressed from the more elevated input end. As the drum is rotated the aggregate and asphalt materials will begin to be drawn forward by gravity as they tumble and cascade between the heating pipes. It will be understood that the heating pipes are hotter nearest the heating chamber and coolest at the opposite end since heat is being exchanged throughout their length by the cooler asphalt and aggregate which are being heated. Preferably, the heat exchange between the asphalt-aggregate composition and the heating tubes will be such that the exterior temperature of the tubes will be about 30°-75°F warmer than the adjacent material and more preferably between about 45° and about 55° F. Thus, with the material being heated to between about 275° and 350°F and preferably about 325°F, at the product recovery end, the amount of heat can be regulated so as to achieve these results. A gas or other fuel burner 37 is illustrated generally in FIGS. 2 and 3 which will direct a flame into the heating chamber. The size, number, and burner capacity and fuel may be selected depending on the size of the apparatus and heat requirements. Moreover, it will be appreciated that with the plurality of pipes being utilized, a rather large heating surface area is provided for heating the asphalt aggregate mixtures so that heating efficiency is greatly facilitated throughout the mixing and heating operation from one end of the drum to the other. In this manner, significant temperature differentials throughout the cross-section of composition at any location along the length of the drum is avoided thereby giving substantial uniformity to the heating and mixing operation with the end result improving the overall quality of the recovered product.

Referring to FIGS. 1-3, the product is recovered through chute 16 into which it will flow gravitationally as the drum is turned and the hot asphalt-aggregate composition falls from an opening at the end of the chute. A hinged cover or gate 40 may be utilized and will normally be closed except for displacement by product falling from the lip of the chute as illustrated in FIG. 1. The hinged cover assists in maintaining the desired integrity of the drum interior and prevents undesired amounts of cooler atmospheric air from entering the system at that point which would interfere with the venting and pressure regulation features previously discussed. Again, it will be understood that the exhaust and product input assembly at one end and the heating chamber and venting assembly at the opposite end will remain stationary as the drum is rotated although these assemblies are removable and can be separated from the drum when desired. During operation, they can be held in place adjacent the respective drum ends by any suitable and available support means.

Turning now to FIG. 4, there is illustrated the apparatus of the invention shown as it could be used in operation. The cylindrical drum 12 together with heating chamber cover 14 and associated venting assembly and exhaust chamber cover 54 and exhaust assembly including stack 31 is shown elevated on a trailer bed 58. Conveniently, the material input end of the apparatus may be elevated utilizing hydraulic lift 56 or similar equivalent means. The apparatus may be moved from one site to another and aggregate and asphalt may be brought directly to the apparatus for mixing on or near the site of operation. For example, the hot, fresh product may be placed into dumping truck 59 at the site of use without the necessity of further storage. Bins A, B, C, D, represent receptacles for holding aggregate of various sizes although it will be appreciated that any number of different sizes of aggregate may be used in a specific product as desired. Moreover, receptacle A may contain used asphalt-aggreate composition which is to be recycled in the apparatus of the invention. However, according to the present invention, make-up asphalt is added directly with the used composition or together with fresh aggregate. Accordingly, the used composition to be recycled according to the present invention, should be analyzed for the amount of make-up asphalt and aggregate required to achieve the desired end composition. The used materials and aggreage are then placed on conveyor belt 50 and then introduced into hopper 59 and into the drum heating and mixing apparatus. Asphalt from reservoir 52 is likewise introduced into the hopper via line 57 simultaneously with the used asphalt and/or new aggregate and the product recovered after mixing and heating as previously described. The aggregate and asphalt may be automatically metered from the reservoirs for the type of composition desired and the process may be run intermittently, in a batch type operation, or continuously, again with varied amounts and sizes of different aggregates if composition changes are required.

Again, it will be understood that because of the use of the simple apparatus and yet efficient method of heating and mixing, a large amount of previously required steps and different apparatus and components may be eliminated. At the same time, atmosphere or air pollution control can be provided for because of the system in which the materials are mixed and heated whereby the smoke and unburned hydrocarbon volatiles are subjected to further combustion. If significant amounts of smoke are found being expelled through either the moisture vent system or exhaust stack, these materials may be directed back to the heating chamber for further combustion. Of course this would require additional duct work and the system would be substantially closed except for air venting as desired. The mixing apparatus and method as disclosed herein does not create significant amounts of dust because of the substantially closed mixing operation. Further, as previously explained, a significant advantage and improvement of the present apparatus eliminates burning of the asphalt because it is not exposed directly to fire or flame and yet at the same time the heating over previously described methods and apparatus is significantly improved and more efficient. These as well as other advantages will be evident to those skilled in the art as will be equipment and apparatus modifications within the purview of this invention.

I claim:

1. Apparatus for producing asphalt-aggregate compositions comprising:
   an elongated rotatable cylindrical drum having a cavity therein and a wall at each end thereof;
   a plurality of spaced hollow pipes extending along the interior of the cavity between the walls, the interior of the tubes communicating exteriorily of said walls;
   means for introducing asphalt and aggregate through one of the walls at an input end of the drum and means for removing composition through the wall at the opposite end;
   means for venting moisture from the drum cavity;
   a heating chamber at the opposite drum end communicating with the pipe interiors and burner means for supplying heat within the chamber; and
   means for venting at least a portion of gaseous mixtures from within the drum cavity to the heating chamber.

2. Apparatus of claim 1 wherein the composition removing means comprises a chute member extending from the wall, through the heating chamber and terminating at an exterior port.

3. Apparatus of claim 2 wherein said gas mixture venting means comprises a duct assembly communicating with and between the chute member and the heating chamber.

4. Apparatus of claim 3 wherein said heating chamber includes one or more ports for introducing atmospheric air therein.

5. Apparatus of claim 4 including an exhaust assembly comprising an exhaust chamber cover at the input end of said drum defining an exhaust chamber communicating with the hollow pipes, and means for drawing heated gases from said heating chamber through said pipes, into said exhaust chamber and means for venting said gas from said exhaust chamber.

6. Apparatus of claim 5 wherein said heating chamber is defined between a drum wall at the drum end and a heating chamber cover which cover includes said duct assembly.

7. Apparatus of claim 6 wherein said heating chamber and exhaust chamber covers are independent of said rotatable drum.

8. Apparatus of claim 3 wherein said moisture venting means is provided through said wall at the input end of the cavity.

* * * * *